(12) United States Patent
Schessel et al.

(10) Patent No.: US 7,711,370 B2
(45) Date of Patent: May 4, 2010

(54) METHOD FOR ESTABLISHING VOICE COMMUNICATIONS USING A MOBILE HANDSET

(75) Inventors: Larry Schessel, Cary, NC (US); Sam Hague, Raleigh, NC (US); Paul Norwood Booth, Campbell, CA (US); Jennifer Kay Walker, Jackson, WY (US)

(73) Assignee: Cisco Technology, Inc., San Jose, CA (US)

(*) Notice: Subject to any disclaimer, the term of this patent is extended or adjusted under 35 U.S.C. 154(b) by 143 days.

(21) Appl. No.: 11/524,724

(22) Filed: Sep. 20, 2006

(65) Prior Publication Data

US 2008/0069069 A1 Mar. 20, 2008

(51) Int. Cl.
*H04W 36/00* (2009.01)
(52) U.S. Cl. .............. 455/442; 455/41.2; 455/436; 455/552.1; 370/328; 370/338; 370/401; 370/352
(58) Field of Classification Search ........ 455/436–442, 455/456.1, 456.5, 41.2, 552.1, 517; 370/342, 370/401, 338, 331, 328, 352; 709/203–206
See application file for complete search history.

(56) References Cited

U.S. PATENT DOCUMENTS

| | | | | |
|---|---|---|---|---|
| 5,915,214 A * | 6/1999 | Reece et al. | ........... | 455/406 |
| 6,363,065 B1 * | 3/2002 | Thornton et al. | ........... | 370/352 |
| 6,614,781 B1 * | 9/2003 | Elliott et al. | ........... | 370/352 |
| 6,678,265 B1 * | 1/2004 | Kung et al. | ........... | 370/352 |
| 6,687,245 B2 * | 2/2004 | Fangman et al. | ........... | 370/356 |
| 6,725,044 B2 * | 4/2004 | Verma et al. | ........... | 455/444 |
| 6,823,188 B1 * | 11/2004 | Stern | ........... | 455/456.1 |
| 6,836,478 B1 * | 12/2004 | Huang et al. | ........... | 370/352 |
| 6,879,574 B2 * | 4/2005 | Naghian et al. | ........... | 370/338 |
| 6,961,575 B2 * | 11/2005 | Stanforth | ........... | 455/445 |
| 7,031,275 B1 | 4/2006 | Borella et al. | | |
| 7,106,848 B1 | 9/2006 | Barlow et al. | | |
| 7,142,862 B2 | 11/2006 | Halsell | | |
| 7,149,499 B1 * | 12/2006 | Oran et al. | ........... | 455/404.2 |
| 7,171,221 B1 | 1/2007 | Amin et al. | | |
| 7,242,923 B2 | 7/2007 | Perera et al. | | |
| 7,257,108 B2 * | 8/2007 | Cheston et al. | ........... | 370/338 |
| 7,323,991 B1 * | 1/2008 | Eckert et al. | ........... | 340/572.1 |
| 7,403,744 B2 * | 7/2008 | Bridgelall | ........... | 455/41.2 |
| 7,519,362 B2 * | 4/2009 | LaPerch | ........... | 455/426.2 |
| 7,606,570 B2 * | 10/2009 | Karaoguz et al. | ........... | 455/442 |
| 2003/0119548 A1 * | 6/2003 | Mohammed | ........... | 455/552 |

(Continued)

OTHER PUBLICATIONS

USPTO, PCT International Search Report and Written Opinion; PCT/US2007/079095; Jul. 23, 2008.

(Continued)

*Primary Examiner*—Sharad Rampuria
(74) *Attorney, Agent, or Firm*—Stolowitz Ford Cowger LLP

(57) ABSTRACT

A mobile handset transmits a radio frequency (RF) signal. The mobile handset determines when it is in close proximity to a Voice over Internet Protocol (VoIP) capable device. If the mobile handset is in close proximity to a VoIP capable device, then the RF signal to the base station is disabled and a communications link is established with the VoIP capable device such that a call can be made by the mobile handset and routed as VoIP packets through the VoIP capable device.

20 Claims, 4 Drawing Sheets

U.S. PATENT DOCUMENTS

| | | | |
|---|---|---|---|
| 2004/0062223 A1* | 4/2004 | Boyd et al. | 370/338 |
| 2004/0081120 A1* | 4/2004 | Chaskar | 370/328 |
| 2004/0203788 A1* | 10/2004 | Fors et al. | 455/439 |
| 2006/0121894 A1* | 6/2006 | Ganesan | 455/432.1 |
| 2006/0121916 A1* | 6/2006 | Aborn et al. | 455/456.5 |
| 2007/0021066 A1* | 1/2007 | Dravida et al. | 455/41.2 |
| 2007/0281617 A1* | 12/2007 | Meylan et al. | 455/41.2 |
| 2008/0026787 A1* | 1/2008 | Ibrahim et al. | 455/552.1 |
| 2008/0192732 A1* | 8/2008 | Riley et al. | 370/352 |
| 2009/0046590 A1* | 2/2009 | Boyes et al. | 370/250 |
| 2009/0238170 A1* | 9/2009 | Rajan et al. | 370/352 |

OTHER PUBLICATIONS

International Searching Authority, International Search Report and Written Opinion, PCT/US07/66275, International Filing date Apr. 10, 2007, Mail date Jul. 18, 2008.

* cited by examiner

US 7,711,370 B2

METHOD FOR ESTABLISHING VOICE COMMUNICATIONS USING A MOBILE HANDSET

FIELD OF THE INVENTION

The present invention relates broadly to communication devices. More specifically, embodiments of the present invention relate to mobile handsets.

BACKGROUND

IP telephony services have become widely available through personal computers and specially developed IP telephony devices. Moreover, personal computers and specially developed IP telephony devices generally offer many additional services and enhanced functionality not offered by traditional mobile handsets (e.g., cellular phone). Nevertheless, in a world that is focused on mobility and progressive complexity, there is a rising need for utilizing the latest advances in IP telephony services while remaining mobile, especially in an enterprise context.

For example, as enterprises grow and spread, there are more companies outfitted with an in-house IP telephony system covering the offices, while requiring their employees to carry mobile handsets such as cellular phones and/or personal digital assistants (PDA) for personal contact and for staying in touch while on the move. However, as mentioned above, many traditional mobile handsets can not access the additional services and enhanced functionality offered by personal computers and specially developed IP telephony devices.

In response, recently, dual-mode cellular/wireless fidelity phones (dual-mode cellular/WiFi phones) capable of working both within the cellular network and within an enterprise Internet Protocol Private Branch exchange (IP PBX) have been created. However, generally these dual-mode cellular/WiFi phones are relatively limited in terms of functionality, storage capacity, connectivity and compatibility with current networked applications and data sources as compared against personal computers and specialized IP telephony devices.

In particular, these dual-mode cellular/WiFi phones are generally not able to access the additional services and enhanced functionality available to many personal computers and specialized equipment without expensive hardware changes that usually require complex hand-off designs. Furthermore, the hardware modified dual-mode cellular/WiFi phones capable of accessing the additional services and enhanced functionality of specialized equipment are typically complex, expensive and suffer from high power consumption. To exacerbate the problem, they often rapidly become obsolete as technology advances.

DETAILED DESCRIPTION

Methods and systems of utilizing a mobile handset to communicate via a Voice over Internet Protocol capable computing device (also referred to as computing device) are described. Reference will now be made in detail to embodiments, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

In overview, embodiments pertain to methods and systems of utilizing a communication standard (e.g., Bluetooth) to allow a mobile handset to communicate via a computing device. In some instances, a mobile handset may be used to communicate with a communications device (e.g., a telephone) through a telephone switching device (e.g., Internet Protocol Private Branch eXchange, or IP PBX) via a computing device such as a VoIP capable desktop computer.

In addition, in other instances, when the mobile handset (e.g., a cellular phone) is not communicating via a computing device, the mobile handset would operate much as it normally does (e.g., a cellular phone would operate within the cellular network); however, the mobile handset could replace office IP phones when communicating via a VoIP capable device. For example, in order to use the mobile handset to replace the office IP phone, in one embodiment, a user places his/her cellular phone in close proximity to his/her office computer with VoIP phone capability. Once the cellular phone is registered to the office computer, the cellular phone will send the digits dialed by the user to the office computer via local wireless radio (e.g., Bluetooth). Once the office computer receives the digits, it then makes the desired call connection utilizing the IP-PBX.

Figure 1A:
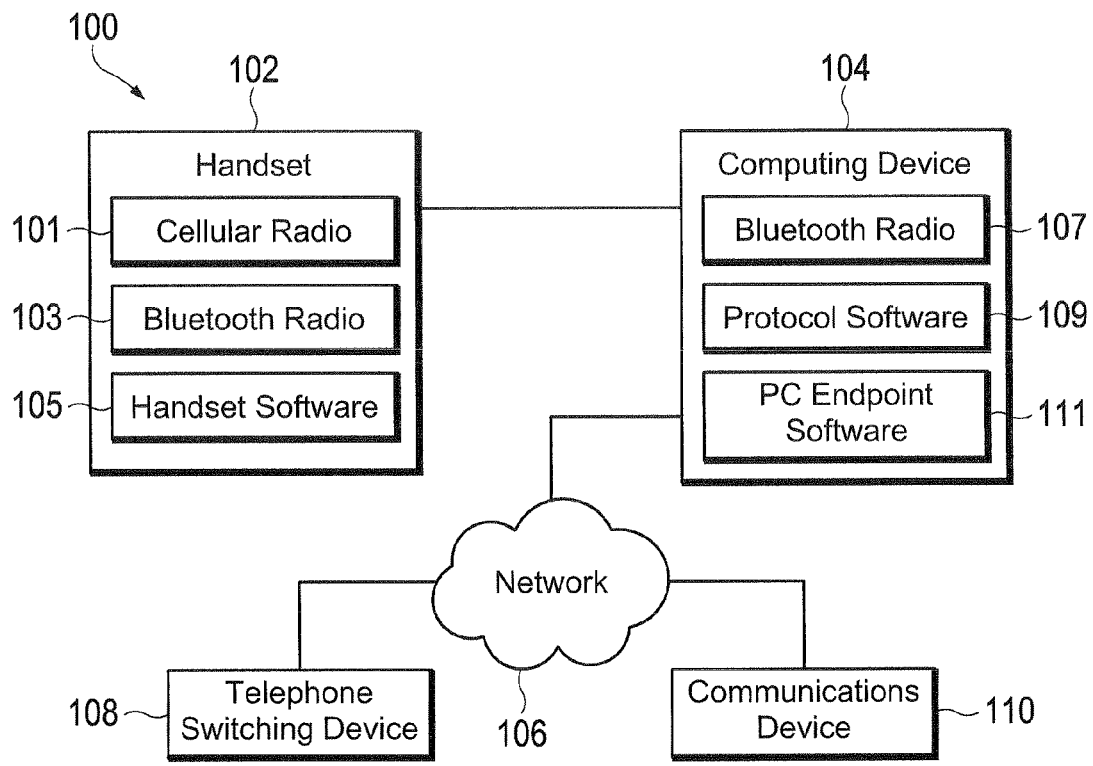
FIG. 1A is a block diagram of an exemplary system upon which embodiments may be implemented.
Figure 1B:
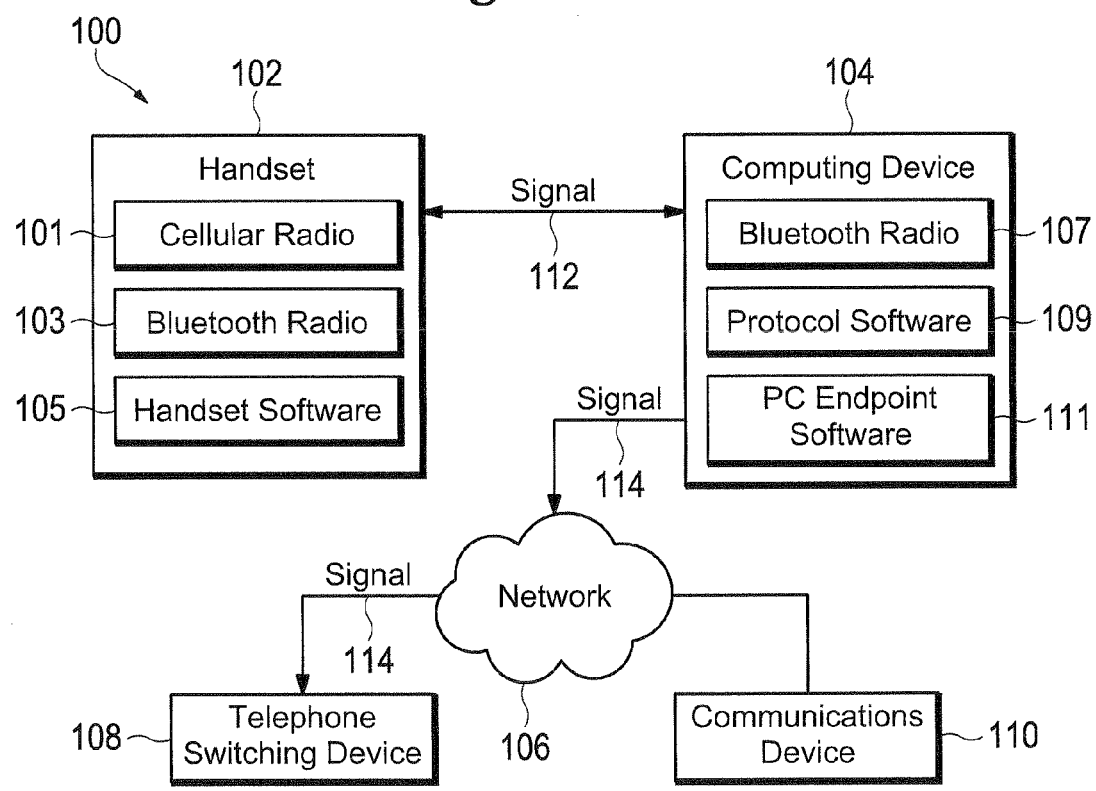
FIG. 1B is a block diagram of an exemplary system upon which embodiments may be implemented.

FIGS. 1A and 1B are block diagrams of an exemplary system 100 upon which embodiments may be implemented. The system 100 shows the components of an exemplary system of utilizing a mobile handset to communicate (e.g., to make and/or receive a call) via a computing device in accordance with the present embodiment. As depicted in FIGS. 1A and 1B, the exemplary system of utilizing a mobile handset to communicate via a VoIP capable device (also referred to as computing device) includes a handset 102 communicatively coupled with a computing device 104, a telephone switching device 108 and a communications device 110 coupled both to one another and to the computing device 104 via the network 106. Although system 100 is shown and described as having certain numbers and types of elements, the present embodiment is not so limited; that is, system 100 may include elements other than those shown, and may include more than one of the elements that are shown.

As depicted by system 100 of FIGS. 1A and 1B, network 106 is a data communications system that interconnects devices. The network 106 can be implemented in a wide variety of ways. For example, network 106 can be implemented as, but is not limited to, a local area network (LAN), a metropolitan area network (MAN), a wide area network (WAN), a storage area network, and/or the Internet. In one embodiment, network 106 is a wireless network. In yet another embodiment, network 106 is an enterprise local area network.

The handset 102, of system 100 of FIGS. 1A and 1B, is a device used to transmit and receive calls. Handset 102 may be, but is not limited to, a type of wireless phone, cellular phone, personal digital assistant (PDA), and/or mobile phone. The handset 102 may include handset software 105, as well as cellular radio 101 and a local wireless radio. As depicted in FIG. 1, in the present embodiment, the local wireless radio is shown as Bluetooth radio 103.

Still in reference to FIGS. 1A and 1B, in the present embodiment, handset software 105 is a set of instructions enabling the handset to initiate and/or receive a call registered through a telephone switching device via computing device. Thus, in the present embodiment, the handset 102 may be used both to initiate and to receive calls through a telephone switching device via a computing device, as well as be used to initiate and/or receive calls not registered through the telephone switching device via the computing device (e.g., the handset may initiate and receive calls by transmitting a radio frequency (RF) signal to a base transceiver station (also referred to as base station). Additionally, in one embodiment, the handset 102 may also provide an array of other functions such as, but not limited to, storing contact information, and sending e-mails.

The computing device 104, of FIGS. 1A and 1B, is a VoIP enabled device or system with the ability to process information, such as, but not limited to, a desktop computer, a softphone, and/or a specialized desktop phone. The computing device 104 may be a stand-alone unit or it may consist of several interconnected units. In the present embodiment, the computing device 104 includes a local wireless radio in the form of Bluetooth radio 107, handset protocol software 109, and modified PC endpoint software 111. In the present embodiment, the softwares are coded instructions (e.g., programs) that enable the computing device 104 to establish a call connection between handset 102 and communications device 110 using telephone switching device 108.

Telephone switching device 108 of system 100, as depicted by FIGS. 1A and 1B, is an equipment that connects calls. The telephone switching device 108 may be, but is not limited to, a Private Branch eXchange (also referred to as PBX), Internet Protocol Private Branch eXchange (also referred to as IP-PBX), or a Wireless Private Branch eXchange (also referred to as WPBX).

Communications device 110, of FIGS. 1A and 1B, is a terminal used to send or receive information, such as, but not limited to, voice, video and/or text information. Communications device 110 may be, but is not limited to, a mobile phone, a satellite phone, a desktop phone, a softphone, a personal digital assistant (also referred to as PDA), a wireless PDA, and a pager.

FIG. 1B is a block diagram of an exemplary registration phase of an exemplary system of utilizing a mobile handset to communicate via a VoIP capable computing device. In reference now to FIG. 1 B, in operation, in one embodiment, handset 102 establishes and/or generates a communications link (also referred to as local wireless link signal 112) with computing device 104 and begins registration process with the computing device 104. Computing device 104 also recognizes the local wireless link signal 112 and sends VoIP packet (e.g., signal 114) to the telephone switching device 108 through network 106. The telephone switching device 108 receives the VoIP packets (depicted as signal 114), registers the computing device 104 as available and idle.

Figure 2A:
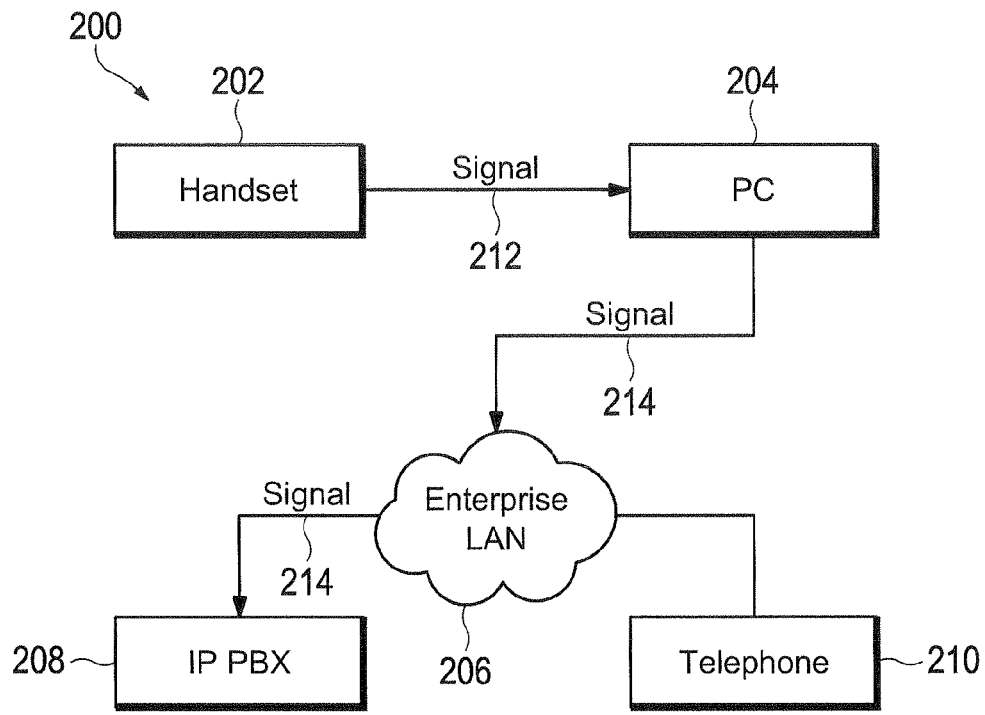
FIG. 2A is a block diagram of an exemplary system upon which embodiments may be implemented.
Figure 2B:
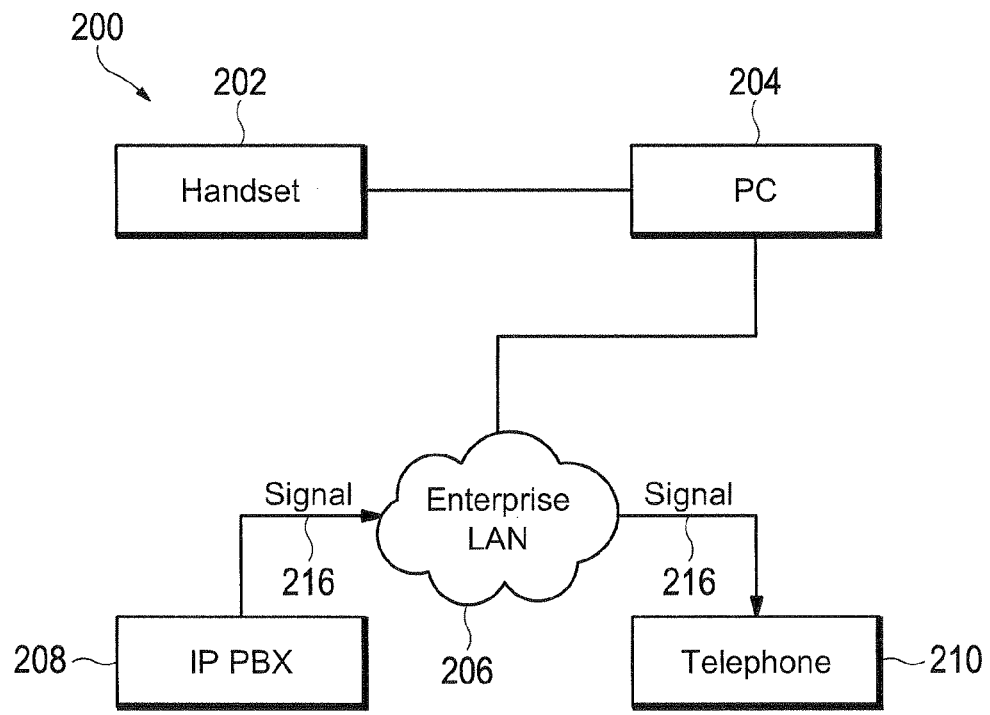
FIG. 2B is a block diagram of an exemplary system upon which embodiments may be implemented.

FIGS. 2A and 2B are block diagrams of an exemplary system 200 upon which embodiments may be implemented. The system 200 shows the components of an exemplary system of utilizing a mobile handset to make a call via a VoIP capable device (also referred to as a computing device). As depicted in FIGS. 2A and 2B, the exemplary system includes a handset 202 communicatively coupled with a computing device 204, a telephone switching device 208 and a communications device 210 coupled both to one another and to the computing device 204 via the network 206.

Still in reference to FIGS. 2A and 2B, the present embodiment is described in the context of an example in which mobile handset 202 has already been used to place a call to telephone 210 through radio frequency (RF) signals to a base station, but when brought in close proximity to a VoIP capable device (e.g., PC 204), handset 202 disables and/or terminates the RF signals and continues the call to telephone 210 via a personal computer 204. In this example, computing device 204 is a personal computer, depicted as PC 204, and the telephone switching device 208 is an IP PBX, depicted as IP PBX 208. The present embodiment is further described in the context of an example in which network 206 is an enterprise local area network, depicted as enterprise LAN 206. However, this example can be readily extended to other situations and embodiments. For example, in another embodiment, communications device 210 may be a mobile phone and network 206 may be a metropolitan area network. Thus, although system 200 is shown and described as having certain numbers and types of elements, the present embodiment is not so limited; that is, system 200 may include elements other than those shown, and may include more than one of the elements that are shown.

In reference now to FIG. 2A, in operation, in one embodiment, the mobile handset 202 has already been used to place a call to telephone 210 through radio frequency (RF) signals to a base station, but when brought in close proximity to a VoIP capable device (e.g., PC 204), handset 202 detects PC 204 and sends signal 212 (also referred to as communications link) to PC 204. Signal 212 may include both signaling streams and various media streams, such as voice stream, audio stream and video stream. In present embodiment, PC 204 sends to the IP PBX 208 VoIP packets (e.g., signal 214) via the enterprise LAN 206. VoIP packets may include video data. As depicted in FIGS. 2A and 2B, in present embodiment, signal 212 is sent to PC 204 by a local wireless radio. Local wireless radios may include, but is not limited to, personal wireless USB, Bluetooth, infrared, and 802.11.

Referring now to FIG. 2B, also in operation, in one embodiment, the IP PBX 208 forwards the VoIP packets (e.g. signal 216) to telephone 210, via the enterprise LAN 206. This signal 216 corresponds to the signal 214 received by IP PBX 208 from PC 204. In present embodiment, the handset 202 is thus able to communicate and/or establish a call connection with telephone 210.

Figure 3A:
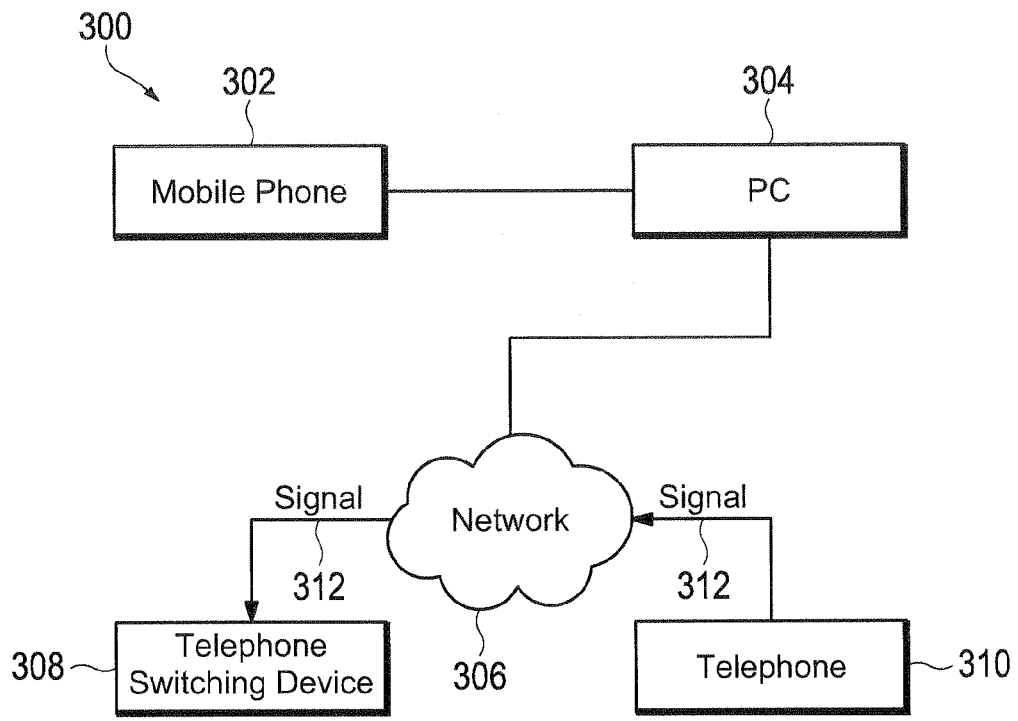
FIG. 3A is a block diagram of an exemplary system upon which embodiments may be implemented.
Figure 3B:
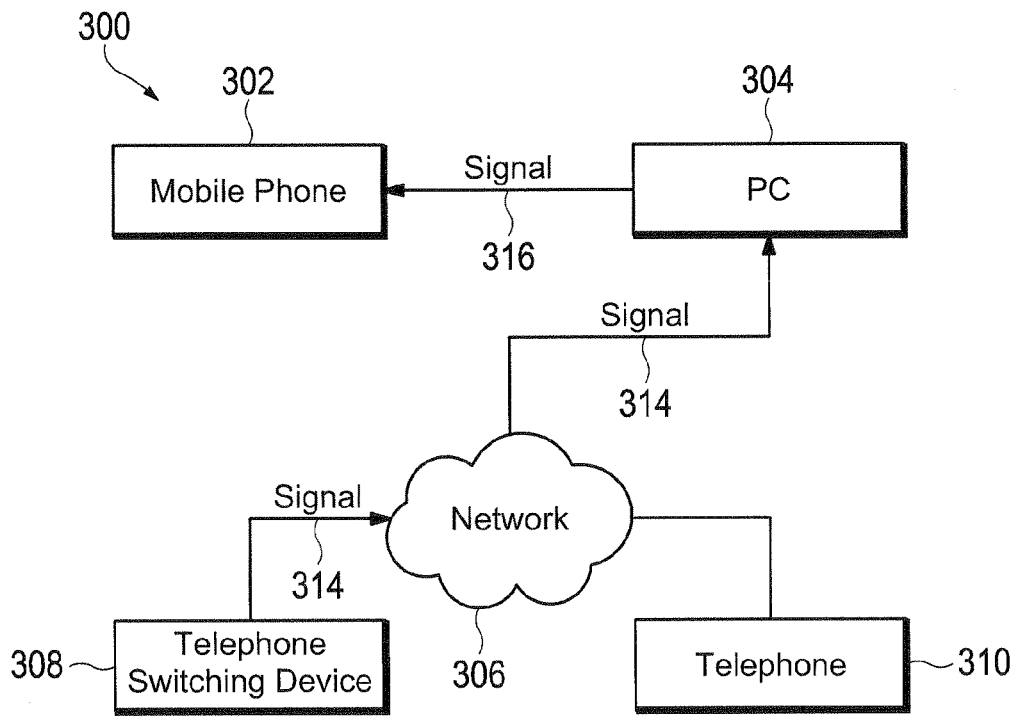
FIG. 3B is a block diagram of an exemplary system upon which embodiments may be implemented.

FIGS. 3A and 3B are block diagrams of an exemplary system 300 upon which embodiments may be implemented. The system 300 shows the components of an exemplary system of utilizing a mobile handset to communicate via a computing device. As depicted in FIGS. 3A and 3B, the exemplary system includes a handset 302 communicatively coupled with a computing device 304, a telephone switching device 308 and a communications device 310 coupled both to one another and to the computing device 304 via the network 306.

In reference to FIGS. 3A and 3B, the present embodiment is described in the context of using a mobile phone to receive a call from a telephone via a VoIP able personal computer. In the present example, computing device 304 is a personal computer, depicted as PC 304. The present embodiment is further described in context of an example in which the handset 302 is a mobile phone, depicted as mobile phone 302. However, this example can be readily extended to other situations and embodiments. Thus, although system 300 is shown and described as having certain numbers and types of elements, the present embodiment is not so limited; that is, system 300 may include elements other than those shown, and may include more than one of the elements that are shown.

In reference now to FIG. 3A, in one embodiment, telephone 310 sends a VoIP packet (e.g., signal 312) to telephone switching device 308 through the network 306. Referring now the FIG. 3B, telephone switching device 308 receives the signal 312 and sends to PC 304 VoIP packet 314 (e.g., signal 314) corresponding to the signal 312 through network 306. PC 304 receives the signal 314 and further sends a signal 316 to mobile phone 302, which generates a communications link between mobile phone 302 and PC 304. The communications link may be established through a communication standard such as, but not limited to, Bluetooth, 802.11, infrared light, and personal wireless USB. Mobile phone 302 receives the signal 316 and thus establishes a call connection with telephone 310.

Figure 4:
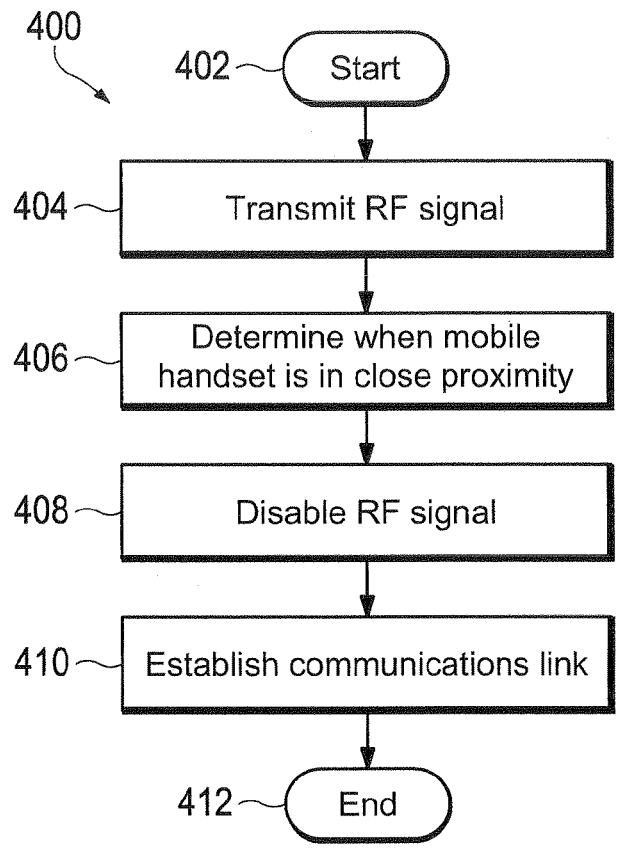
FIG. 4 illustrates a flowchart showing a method of using a mobile handset to establish communication via a computing device, according to an embodiment.

FIG. 4 illustrates a flowchart showing a method 400 of using a mobile handset to establish voice communication (also referred to as communication) via a computing device, according to an embodiment. Although specific steps are disclosed in flowchart 400, such steps are exemplary. That is, various embodiments are well suited to performing a variety of other additional steps or variations of the steps recited in flow chart 400. The steps in flowchart 400 may also be performed in an order different than presented. At block 402 of FIG. 4, the process starts.

At block 404 of FIG. 4, in one embodiment, a mobile handset is used to transmit a radio frequency (RF) signal to a base station to provide voice communications. At block 406 of FIG. 4, the mobile handset determines whether it is in close proximity to a VoIP capable device. The VoIP capable device may be referred to as a computing device and may include electronic equipment such as, but not limited to, a desktop computer and a notebook computer.

At block 408, if the mobile handset is in close proximity to a VoIP capable device, then RF signals transmitted by the mobile handset to a base station (e.g., a cellular phone tower) is disabled. At block 410, if the mobile handset is in close proximity to a VoIP capable device, then a communications link with the VoIP capable device is established. In one embodiment, the VoIP device is capable of forwarding a VoIP packet to a telephone switching device, which corresponds to a signal received by the VoIP capable device from the mobile handset. In addition, the telephone switching device is capable of further forwarding the VoIP packet through a network to a communications device. A call connection may thus be established with the communications device by the mobile handset. In one embodiment, the communications device may be a pager. In another embodiment, the communications device may be a softphone. At block 412, the process ends.

Figure 5:
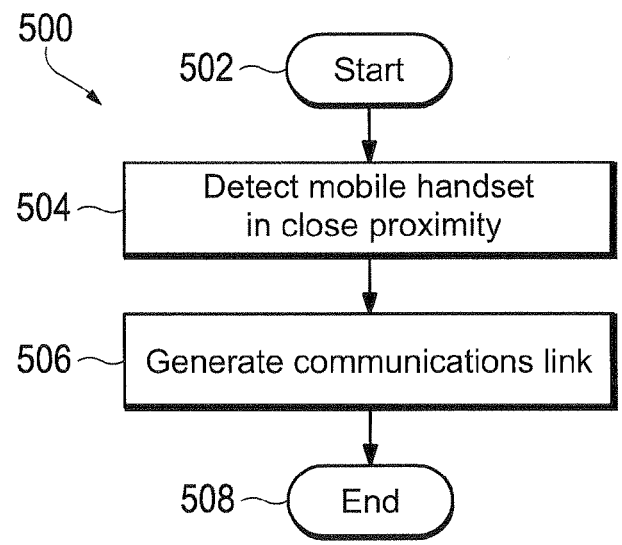
FIG. 5 is a flow chart illustrating another exemplary method of using a mobile handset to establish communication via a computing device, according to an embodiment.

FIG. 5 is a flow chart illustrating another exemplary method 500 of using a VoIP capable device to establish voice communications, according to an embodiment. Although specific steps are disclosed in flowchart 500, such steps are exemplary. That is, various embodiments are well suited to performing a variety of other additional steps or variations of the steps recited in flow chart 500. The steps in flowchart 500 may also be performed in an order different than presented. At block 502 of FIG. 5, the process starts.

At block 504 of FIG. 5, a VoIP capable device detects nearby, or in close proximity, a mobile handset capable of transmitting a RF signal to a base transceiver station and capable of establishing a communications link with the VoIP capable device.

At block 506, the VoIP capable device generates a communications link with the mobile handset and if the mobile handset was transmitting a RF signal to a base transceiver station, the RF signal is terminated. Communication between the mobile handset and the computing device is maintained. In one embodiment, communications link comprise signals in the form of a local wireless radio wave. The communications link signals may signals sent and received by Bluetooth radios (e.g., Bluetooth radio 103 of FIGS. 1A and 1B) that is part of the mobile handset and the VoIP capable device used. In addition, communications link signals may include various forms of streams, such as, but not limited to, signaling streams, audio streams, video streams, and text streams.

In one embodiment, the VoIP capable device is capable of receiving a VoIP packet from a telephone switching device (e.g., an IP PBX) by way of a network (e.g., an enterprise LAN. Furthermore, the telephone switching device from which a computing device receives the VoIP packet may also be capable of receiving a VoIP packet from a communications device (e.g., a telephone and/or a satellite phone) by way of a network. Thus in such a way, a call connection between the mobile handset and the communications device may be established. A call connection may take various forms, such as, but not limited to, a voice call, a video call, and/or a conference call.

At block 510 of FIG. 5, the process ends.

Thus by having a method of using a mobile handset to establish communication with a communications device (e.g., a telephone) via a VoIP capable device, once registered, the VoIP capable device would act as a gateway between the mobile handset and the communications device. In instances where the communication is through an IP PBX, the VoIP capable device allows the mobile handset to appear to the IP PBX as a wireline technology that enables routing of data flows over a packet-switched network. Specifically, if the associated VoIP capable device could operate as a vendor-specific IP phone, then this means the mobile handset would gain the enhanced capabilities and services previously reserved for the vendor-specific IP phone.

To illustrate, in an enterprise context where there is a cellular phone, a laptop computer capable of video calls, and an associated IP-PBX, the cellular phone could be used to set up video calls through the IP-PBX. In such instances, the benefits of the present embodiment may include: lower expenses resulting from using less costly local enterprise minutes as opposed to costly cellular minutes within the enterprise, enhanced services when used within the enterprise, and having the multi-functionality of a consolidated device that can work both within office and cellular services. Moreover, the present embodiment has the general added advantages of lower power consumption and relatively minor software changes as compared with traditional dual-mode cellular/WiFi handsets.

What is claimed is:

1. A method comprising:
   transmitting a radio frequency (RF) signal from a mobile handset to a base station;
   determining if the mobile handset is within a zone, wherein the zone comprises a spatial area within which a communication link between a Voice over Internet Protocol (VoIP) capable device and the mobile handset can be established;
   disabling the transmission of the RF signal to the base station if the mobile handset enters the zone;
   establishing the communications link between the mobile handset and the VoIP capable device;
   wherein the VoIP capable device is configured to operate as an Internet Protocol (IP) phone;
   registering the mobile handset to the VoIP capable device via the communications link;
   wherein registration of the mobile handset triggers registration of the VoIP capable device to a telephone switching device via a network and communicatively couples the mobile handset to the telephone switching device without registering the mobile handset to the telephone switching device, wherein the mobile handset is not identified by the registration of the VoIP capable device to the telephone switching device and wherein the mobile handset appears to the telephone switching device to be a wireline VoIP device;
   sending a call to be routed through the VoIP capable device to the telephone switching device, wherein sending the call comprises communicating the dialing information to the VoIP capable device for connecting the call; and
   accessing one or more vendor specific services associated with the VoIP capable device from the mobile handset via the communications link.

2. The method as recited in claim 1 wherein the telephone switching device is an Internet Protocol Private Branch Exchange, Private Branch Exchange, or Wireless Private Branch Exchange, or combinations thereof.

3. The method as recited in claim 1 wherein the call comprises text, audio, voice or video data, or combinations thereof.

4. The method as recited in claim 1
   wherein sending further comprises routing the call from the mobile handset to a cellular phone, satellite phone, desktop phone, softphone, personal digital assistant, or pager, or combinations thereof and
   wherein the call is routed via the VoIP capable device and the telephone switching device.

5. The method as recited in claim 1 wherein registration indicates to the telephone switching device that the VoIP capable device is available and idle.

6. A VoIP capable device comprising:
   one or more processors; and
   a memory containing instructions executable by the processors, the processors when executing the instructions are configured to:
      detect a mobile handset within a sector, wherein the mobile handset is configured to transmit an RF signal to a base transceiver station and wherein the sector comprises a spatial area within which a communications link between the VoIP capable device and the mobile handset can be established;
      establish the communications link between the VoIP capable device and the mobile handset;
      wherein the VoIP capable device is an IP phone or personal computer;
      trigger cessation of the RF signal transmission from the mobile handset to the base transceiver station upon detecting the mobile handset within the sector;
      receive a first registration request from the mobile handset via the communications link;
      responsive to receiving the first registration request from the mobile handset, send a second registration request to a telephone switching device to register the VoIP capable device to the telephone switching device via a network, wherein the registration of the VoIP capable device enables communicative coupling of the mobile handset to the telephone switching device without registering or identifying the mobile handset to the telephone switching device and wherein the mobile handset appears to the telephone switching device as a wireline communication device;
      receive a call from the mobile handset to be routed to the telephone switching device via the VoIP capable device, wherein the call comprises the dialing information for connecting the call; and
      access one or more vendor specific services associated with the VoIP capable device from the mobile handset via the communications link.

7. The VoIP capable device as recited in claim 6 wherein routing the call further comprises generating VoIP packets to communicate the call from the mobile handset to the telephone switching device.

8. The VoIP capable device as recited in claim 6 wherein the telephone switching device is an Internet Protocol Private Branch Exchange, Private Branch Exchange, or Wireless Private Branch Exchange, or combinations thereof.

9. The VoIP capable device as recited in claim 6 wherein the call comprises text, audio, voice or video data, or combinations thereof.

10. The VoIP capable device as recited in claim 6 wherein the communications link conforms to a communications standard comprising; Bluetooth, Institute of Electrical and Electronics Engineers (IEEE) 802.11, Infrared Data Association, or Wireless USB, or combinations thereof.

11. A system for multi-mode wireless communication, the system comprising:
    a VoIP capable device configured to;
       register a mobile handset to the VoIP capable device via a communications link wherein registration of the mobile handset triggers registration of the VoIP capable device to a telephone switching device, communicatively coupling the mobile handset to the telephone switching device without registering the mobile handset to the telephone switching device,
       wherein the mobile handset is not identified by the registration of the VoIP capable device to the telephone switching device;
       wherein the mobile handset appears to the telephone switching device to be a wireline VoIP capable device; and
    a mobile handset configured to;
       transmit RF signals to a base station;
       establish a communications link with the VoIP capable device upon entering a communication sector, the communication sector being a spatial area within which the communications link can be formed between the mobile handset and the VoIP capable device and wherein the mobile handset is configured to send a call to be routed as VoIP packets through the VoIP capable device to the telephone switching device, wherein the call comprises the dialing information for connecting the call;

access one or more vendor specific services associated with the VoIP capable device via the communications link; and terminate RF transmission if the communications link with the VoIP capable device is established.

12. The system as recited in claim 11 wherein the VoIP capable device is further configured to register to the telephone switching device via a network; and wherein the registration of the VoIP capable device communicatively couples the mobile handset to the telephone switching device.

13. The system as recited in claim 11 wherein the telephone switching device comprises an; Internet Protocol Private Branch Exchange, Private Branch Exchange, or Wireless Private Branch Exchange, or combinations thereof.

14. The system as recited in claim 11 wherein the communications link conforms to a communication standard comprising Bluetooth, Institute of Electrical and Electronics Engineers (IEEE) 802.11, Infrared Data Association, or Wireless USB, or combinations thereof.

15. A computer-useable medium having computer-executable instruction code embodied thereon for causing a computer system to execute a computer-implemented method for establishing multi-modal wireless communication stored thereon, the method comprising:

detecting a mobile handset within a sector, wherein the mobile handset is configured to transmit an RF signal to a base transceiver station and wherein the sector comprises a spatial area within which a communications link between an IP phone and the mobile handset can be established;

establishing the communications link between the IP phone and the mobile handset;

triggering cessation of the RF signal transmission from the mobile handset to the base transceiver station upon detecting the mobile handset within the sector;

registering the mobile handset to the IP phone via the communications link wherein registration of the mobile handset initiates registration of the IP phone to a telephone switching device via a network, wherein the registration of the IP phone to the telephone switching device communicatively couples the mobile handset to the telephone switching device without identifying or registering the mobile handset to the telephone switching device, wherein the mobile handset is identifiable to the telephone switching device as a wireline device;

routing a call from the mobile handset through the IP phone to the telephone switching device, wherein the call comprises dialing information for connecting the call; and providing the mobile handset access to one or more vendor specific services or functions of the IP phone via the communications link.

16. The computer-useable medium as recited in claim 15 wherein the telephone switching device is an Internet Protocol Private Branch Exchange, Private Branch Exchange, or Wireless Private Branch Exchange, or combinations thereof.

17. The computer-useable medium as recited in claim 15 wherein the communications link conforms to a communication standard comprising Bluetooth, Institute of Electrical and Electronics Engineers (IEEE) 802.11, Infrared Data Association, or Wireless USB, or combinations thereof.

18. A computer-useable medium having computer-executable instruction code embodied thereon for causing a computer system to execute a computer-implemented method for establishing multi-modal wireless communication stored thereon, the method comprising:

detecting a mobile handset within a sector wherein the sector comprises a spatial area within which a communications link between a VoIP capable softphone and the mobile handset can be established;

establishing the communications link between the VoIP capable softphone and the mobile handset;

triggering cessation of an RF signal transmission from the mobile handset to a base transceiver station upon detecting the mobile handset within the sector;

receiving a first registration request from the mobile handset on the VoIP capable softphone via the communications link;

sending a second registration request to a telephone switching device to register the VoIP capable softphone to the telephone switching device via a network wherein the registration of the VoIP capable softphone enables communicative coupling of the mobile handset to the telephone switching device without identifying or registering the mobile handset to the telephone switching device, wherein the mobile handset appears to the telephone switching device to be a wireline IP device;

providing the mobile handset to one or more vendor specific services or functions of the VoIP capable softphone via the communications link; and routing a call from the mobile handset through the VoIP capable softphone to the telephone switching device, wherein the call comprises information for connecting the call.

19. The computer-useable medium as recited in claim 18 wherein the telephone switching device is an Internet Protocol Private Branch Exchange, Private Branch Exchange, or Wireless Private Branch Exchange, or combinations thereof.

20. The computer-useable medium as recited in claim 17 wherein the communications link conforms to a communication standard comprising Bluetooth, Institute of Electrical and Electronics Engineers (IEEE) 802.11, Infrared Data Association, or Wireless USB, or combinations thereof.

* * * * *